United States Patent
Choi et al.

(10) Patent No.: US 10,377,551 B2
(45) Date of Patent: Aug. 13, 2019

(54) BLOW MOLDED CONTAINER

(71) Applicant: TECHTRONIC INDUSTRIES COMPANY LIMITED, Tsuen Wan, New Territories (HK)

(72) Inventors: Wai Tat Choi, Dongguan (CN); Zengjun Jiang, Dongguan (CN); Sanming Wang, Dongguan (CN); Chao Zhong, Dongguan (CN); Huadong Zhang, Dongguan (CN)

(73) Assignee: TECHTRONIC INDUSTRIES COMPANY LIMITED, Tsuen Wan, New Territories (HK)

(*) Notice: Subject to any disclaimer, the term of this patent is extended or adjusted under 35 U.S.C. 154(b) by 138 days.

(21) Appl. No.: 15/316,446

(22) PCT Filed: Aug. 6, 2014

(86) PCT No.: PCT/CN2014/083772
§ 371 (c)(1),
(2) Date: Dec. 5, 2016

(87) PCT Pub. No.: WO2015/184681
PCT Pub. Date: Dec. 10, 2015

(65) Prior Publication Data
US 2017/0197774 A1    Jul. 13, 2017

Related U.S. Application Data

(63) Continuation of application No. PCT/CN2014/079415, filed on Jun. 6, 2014.

(51) Int. Cl.
*B65D 25/10*    (2006.01)
*B65D 81/02*    (2006.01)
(Continued)

(52) U.S. Cl.
CPC ........... *B65D 81/027* (2013.01); *B25H 3/003* (2013.01); *B25H 3/006* (2013.01); *B25H 3/02* (2013.01); *B29L 2031/712* (2013.01)

(58) Field of Classification Search
CPC ...... B65D 81/027; B65D 25/10; B25H 3/003; B25H 3/006; B25H 3/02; B25H 3/023; B25H 3/025; B29L 2031/712
See application file for complete search history.

(56) References Cited

U.S. PATENT DOCUMENTS 3,441,071 A * 4/1969 Schurman et al. ......................... B29C 49/0031
190/119
3,795,265 A    3/1974 Schurman et al.
(Continued)

FOREIGN PATENT DOCUMENTS

CN    2336929    9/1999
CN    1817617    8/2006
(Continued)

OTHER PUBLICATIONS

International Search Report and Written Opinion for Application No. PCT/CN2014/083772 dated Jan. 1, 2015 (7 pages).
(Continued)

*Primary Examiner* — Stephen J Castellano
(74) *Attorney, Agent, or Firm* — Michael Best & Friedrich LLP

(57) ABSTRACT

A blow molded container includes a main member (20) forming a tool cavity. The main member (20) has an inner surface. The main member (20) further contains at least one corner portion (30) and at the corner portion (30), the main member (20) includes at least a first layer (40) and a second layer (42). The first layer (40) forming the inner surface, and the first layer (40) and the second layer (42) are affixed together along a predetermined pattern while being sepa-
(Continued)

rated from each other elsewhere. The first layer (40) is formed with a first protruding part (143) along the predetermined pattern, and the second layer (42) is formed with a second protruding part (145) along the predetermined pattern. The first protruding part (143) and the second protruding part (145) are affixed together.

18 Claims, 24 Drawing Sheets

(51) Int. Cl.
*B25H 3/02* (2006.01)
*B25H 3/00* (2006.01)
*B29L 31/00* (2006.01)

(56) References Cited

U.S. PATENT DOCUMENTS

| | | |
|---|---|---|
| 3,822,083 A | 7/1974 | Zeamer |
| 4,340,139 A | 7/1982 | Wilcox et al. |
| 5,125,511 A | 6/1992 | Chamberlin et al. |
| 6,044,973 A | 4/2000 | Vasudeva |
| D478,209 S * | 8/2003 | Chen .................. D3/282 |

FOREIGN PATENT DOCUMENTS

| | | |
|---|---|---|
| CN | 202763823 | 3/2013 |
| DE | 202006007914 | 7/2006 |
| DE | 202010013025 | 4/2011 |
| DE | 102010040616 | 3/2012 |
| DE | 202014101746 | 4/2014 |

OTHER PUBLICATIONS

International Search Report for Application No. PCT/CN2014/079415 dated Feb. 2, 2015 (4 pages).
Extended European Search Report for Application No. 14894160.2 dated Dec. 7, 2017 (9 pages).

* cited by examiner

BLOW MOLDED CONTAINER

CROSS-REFERENCE TO RELATED APPLICATION

This application is a national stage filing under 35 U.S.C. 371 of PCT International Application No. PCT/CN2014/083772 filed Aug. 6, 2014, which is a continuation of PCT International Application No. PCT/CN2014/079415 filed Jun. 6, 2014, which are hereby incorporated by reference herein in their entireties.

FIELD OF INVENTION

This invention relates generally to the field of blow molded plastic containers, and more specifically to corner design of a generally rectangular blow molded plastic container that such corners have improved resistance to deformation.

BACKGROUND OF INVENTION

Many types of articles, such as toolboxes for a portable power tool, are manufactured by using blow-molding techniques to produce a double wall body. By producing an article in this manner, one is able to easily create an article that has two, hard plastic walls with a buffering space between them, thereby resulting in a body with a multitude of desirable physical characteristics, such as strength, rigidity, scuff resistance, and impact absorption, but that is also relatively inexpensive to manufacture.

Typically, the blow-molding process involves the use of a mold consisting of two separate halves or portions having cavities of particularly desired shapes and sizes. Usually, one extrudes a large-diameter, sealed tube of molten material (commonly referred to as a "parison"), places the tube between the mold halves, and closes the mold around the tube. Fluid pressure is then introduced into the tube, forcing the molten tube against the walls of the cavities, conforming the tube to the shape thereof. The pressure is maintained until the molten material cools and solidifies. The pressure is then released, the mold halves are pulled apart, and the hardened article is ejected therefrom.

However, since fluid pressure is introduced to force the molten tube against the walls to create predetermined spacing between the walls, problems will be encountered for corner portions of the article where its surface geometry experiences sudden changes in orientation and/or plane of extension. In particular, to ensure that the thickness of each wall of the article at the corner portion is uniform and achieving a desired level, spacing of the two walls at the corner portion where sudden change of surface direction happens often have to be increased to avoid accidental adhesion of the two walls or non-uniformity in material strength. However, with the increased spacing between the walls, the corner portion is more vulnerable to external impact that easily results in deformation or dent of the corner portion.

SUMMARY OF INVENTION

In the light of the foregoing background, it is an object of the present invention to provide an alternate blow molded container with improved corner portion design.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention in one aspect is a blow molded container including a main member forming a tool cavity. The main member has an inner surface. The main member further contains at least one corner portion and at the corner portion, the main member includes at least a first layer and a second layer. The first layer forming the inner surface, and the first layer and the second layer are affixed together along a predetermined pattern while being separated from each other elsewhere. The first layer is formed with a first protruding part along the predetermined pattern, and the second layer is formed with a second protruding part along the predetermined pattern. The first protruding part and the second protruding part are affixed together.

Preferably, a surface of the first protruding part facing the second layer is closer to the second layer than a portion of the first layer immediately adjacent to the predetermined pattern.

Additionally/alternatively, a surface of the second protruding part facing the first layer is closer to the first layer than a portion of the second layer immediately adjacent to the predetermined pattern.

In one implementation, the first protruding part and the second protruding part are of equal height.

In one variation, the first layer is formed with a third protruding part which protrudes from the first layer toward a direction away from the tool cavity.

Preferably, the third protruding part is in the form of a rim portion on an external surface of the blow molded container.

Preferably, the third protruding part is a portion of the first layer bent to form the rim portion.

In one implementation, the third protruding part is in the form of a bent surface connecting the first layer and second layer.

In some variations, the predetermined pattern is a plurality of dot regions separated from each other.

In other variations, the predetermined pattern is a continuous area.

In some further variations, the continuous area further includes a plurality of sub-areas, wherein at least two the sub-areas are positioned in different planes.

In some further variations, the predetermined pattern further contains a plurality of line segments connected to each other.

Preferably, the main member is in a rectangular shape.

Preferably, the first layer and the second layer are of equal thickness.

BRIEF DESCRIPTION OF FIGURES

The foregoing and further features of the present invention will be apparent from the following description of preferred embodiments which are provided by way of example only in connection with the accompanying figures, of which:

FIG. 7c shows an alternative internal structure of the corner portion of FIG. 7a.

FIG. 10c illustrates the adhering region in the corner portion of FIG. 10a.

FIG. 11c illustrates the adhering region in the corner portion of FIG. 11a.

FIG. 12c illustrates the adhering region in the corner portion of FIG. 12a.

FIG. 13c illustrates the adhering region in the corner portion of FIG. 13a.

FIG. 17b a cross-sectional view of the corner portion in FIG. 17a.

FIG. 18b a cross-sectional view of the corner portion in FIG. 18a.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Figure 1:
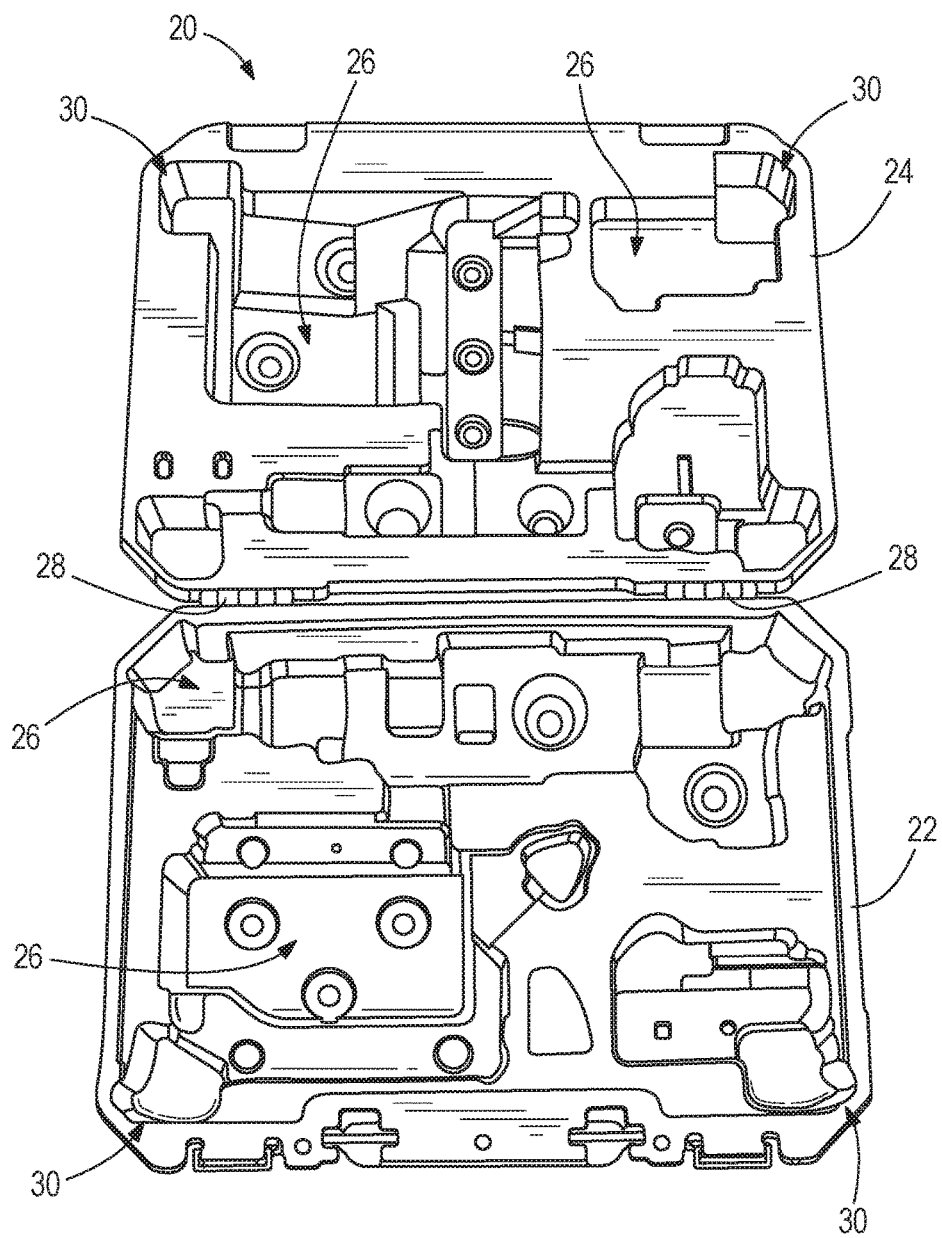
FIG. 1 illustrates a blow molded container in its open status according to one embodiment of the present invention.

Referring now to FIG. 1, the first embodiment of the present invention is a blow molded container for storing various tools and accessories, in particular a portable electrical drill with various drill bits. The blow molded container includes a main member 20 forming a tool cavity. As illustrated in FIG. 1 the main member 20 is consisted of a base member 22, and a lid member 24 hingedly connected to the based member 22 by two hinges 28. Preferably, for each hinge 28 one piece is integrally formed with the base member 22 and the other piece is integrally formed with the lid member 24. On both the base member 22 and the lid member 24, there are formed various cavities 26 corresponding to form factors of the electrical drill and its accessories. The cavities 26 thus make up the tool cavity of the main member 20 for storing the portable electrical drill and its accessories. Also illustrated in FIG. 1 are various corner portions 30 of the main member 20 which will be described in greater details below.

Figure 2A:
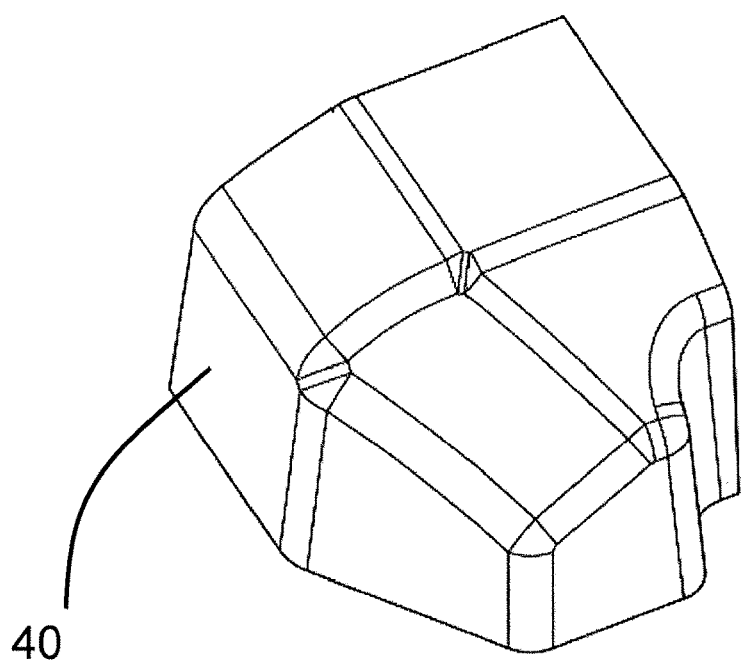
FIG. 2a is a perspective view of a corner portion of a blow molded container according to one embodiment of the present invention.
Figure 2B:
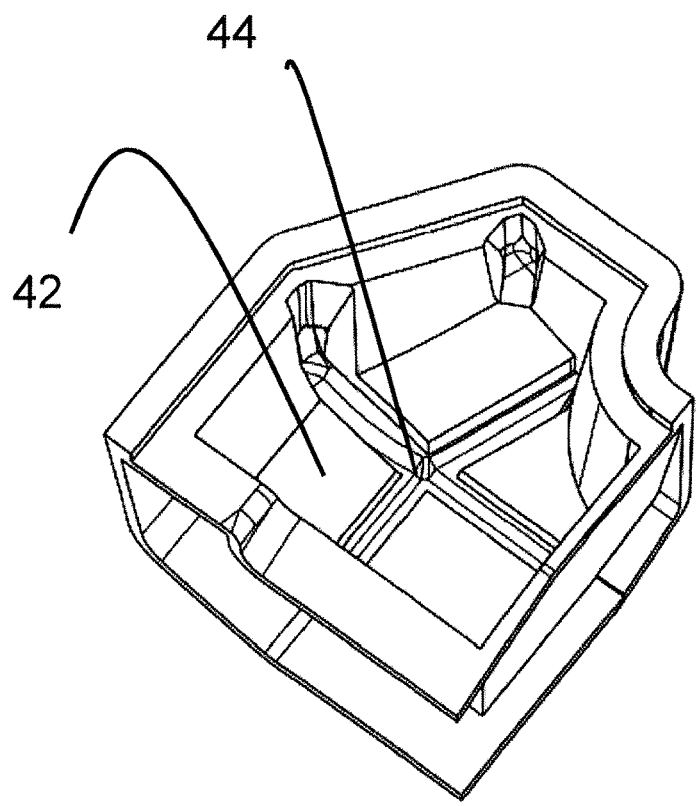
FIG. 2b shows the corner portion in FIG. 2a from another viewpoint.
Figure 3:
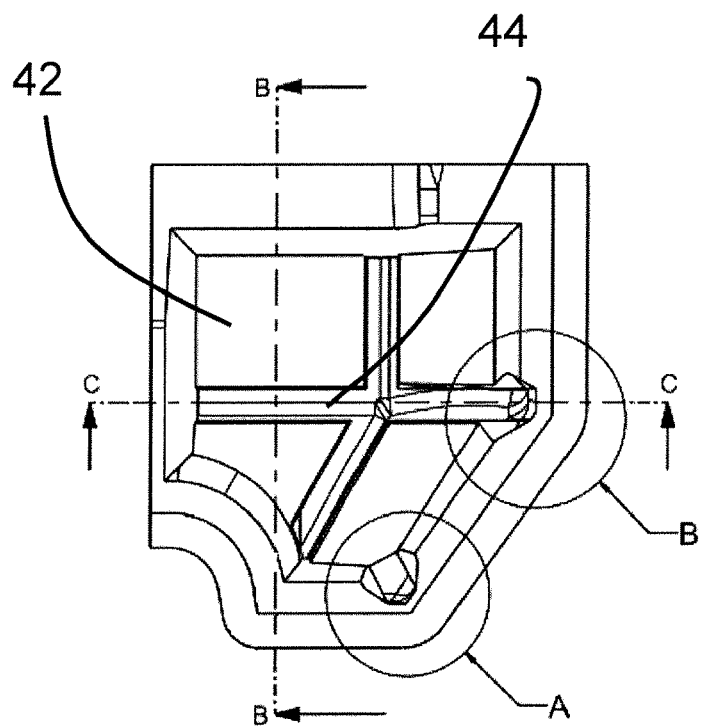
FIG. 3 shows a front view of the corner portion in FIG. 2a towards its internal cavity.
Figure 4A:
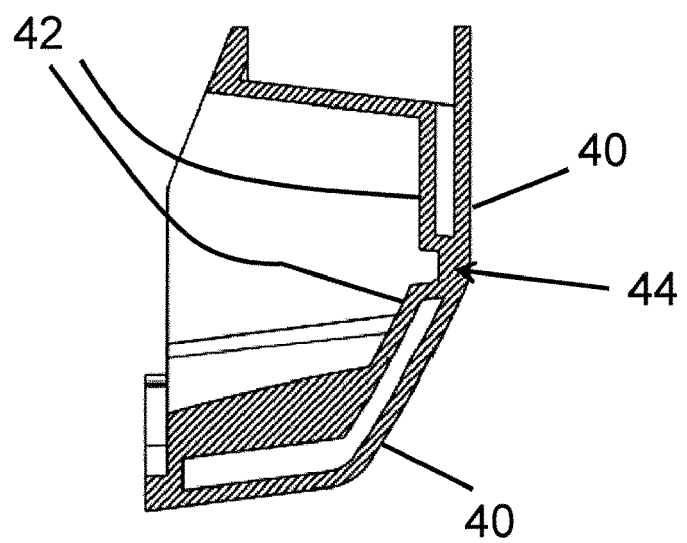
FIG. 4a is the cross-sectional view of the corner portion in FIG. 3 along line B-B.

Turning now to FIGS. 2a-2b, the corner portion of a blow molded container according to one embodiment has an irregular geometrical shape. The corner portion includes a first layer 40 and a second layer 42 which form the external wall and the internal wall of the blow molded container respectively. Note that although in FIGS. 2a-2b only a part of the blow molded container is shown (i.e. the corner portion), the first layer 40 and the second layer 42 extends to other parts of the blow molded container as well to form the whole main member. The first layer 40 and a second layer 42 are adhered together along a predetermined pattern, in this embodiment the kissing lines 44. In FIG. 2b and FIG. 3, the kissing lines 44 are best shown to have a substantial cross shape, i.e. two lines intersect at their respective middle portions. The structure of the kissing lines 44 is shown clearly in FIG. 4a and FIG. 4b, both showing cross-sectional view of the corner portion and in particular relevant positioning of the first layer 40 and the second layer 42. As shown in FIG. 4a, in certain regions of the corner portion the first layer 40 forming the external surface of the blow molded container and the second layer 42 forming the internal surface of the blow molded container are affixed together along the kissing line 44, but are otherwise separated from each other elsewhere as shown in FIG. 4a. Preferably, the distance between the first layer 40 and the second layer 42 is kept constant when they are separated. Also, preferably the thickness of the first layer 40 and the second layer 42 are equal, and in one exemplary embodiment the thickness of both the first layer 40 and the second layer 42 is 2.5 mm. However, at the kissing line 44 region when the first layer 40 and the second layer 42 are affixed together, the total thickness of the material equals to the sum of the thickness of the first layer 40 and the second layer 42. For example, in case the thickness of both the first layer 40 and the second layer 42 are both 2.5 mm, the total thickness at the kissing line 44 will be 5 mm.

Figure 4B:
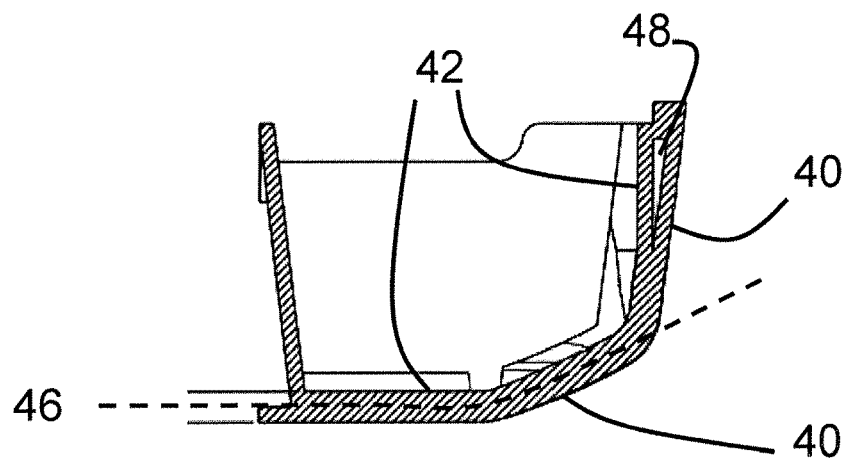
FIG. 4b is the cross-sectional view of the corner portion in FIG. 3 along line C-C.
Figure 5A:
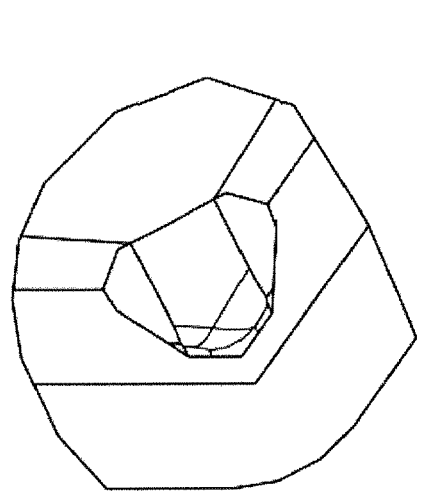
FIG. 5a shows the enlarged view of the tip portion A in FIG. 3.
Figure 5B:
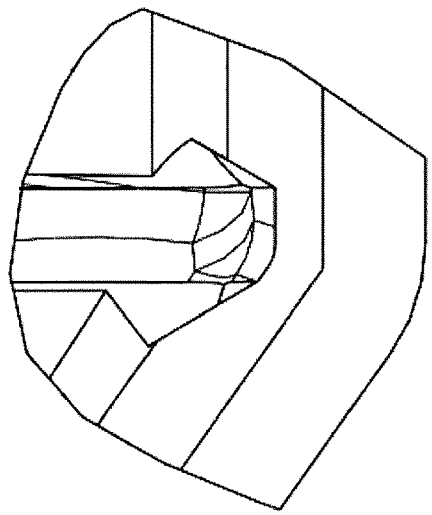
FIG. 5b shows the enlarged view of the tip portion B in FIG. 3.

FIG. 4b shows the cross sectional view of the corner portion in other regions, where the first layer 40 and the second layer 42 are affixed together along the kissing line (indicated by the line 46), but at an upper point the first layer 40 and the second layer 42 starts to separate from each other and a gap 48 is created between them as a result. FIGS. 5a-5b show other kissing line designs at some tip portions of the corner portion.

Figure 6A:
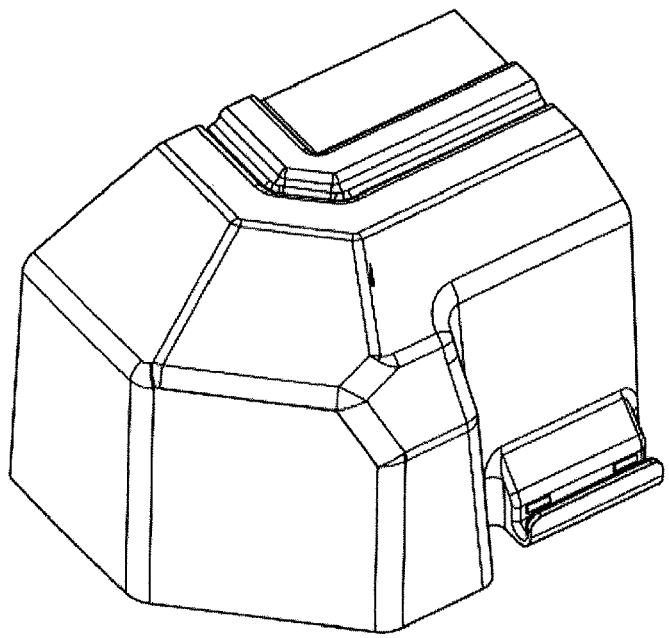
FIG. 6a is a perspective view of a corner portion of a blow molded container according to another embodiment of the present invention.
Figure 6B:
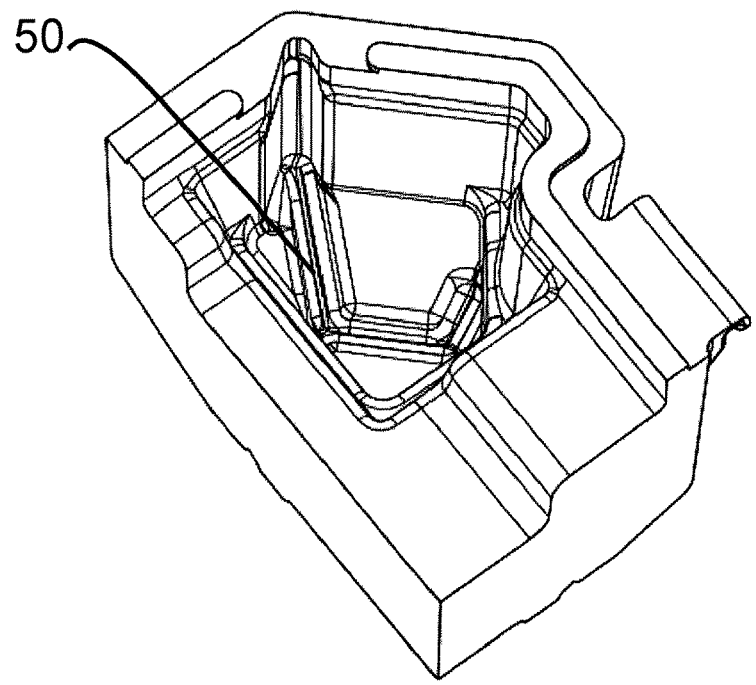
FIG. 6b shows the corner portion in FIG. 6a from another viewpoint.
Figure 7A:
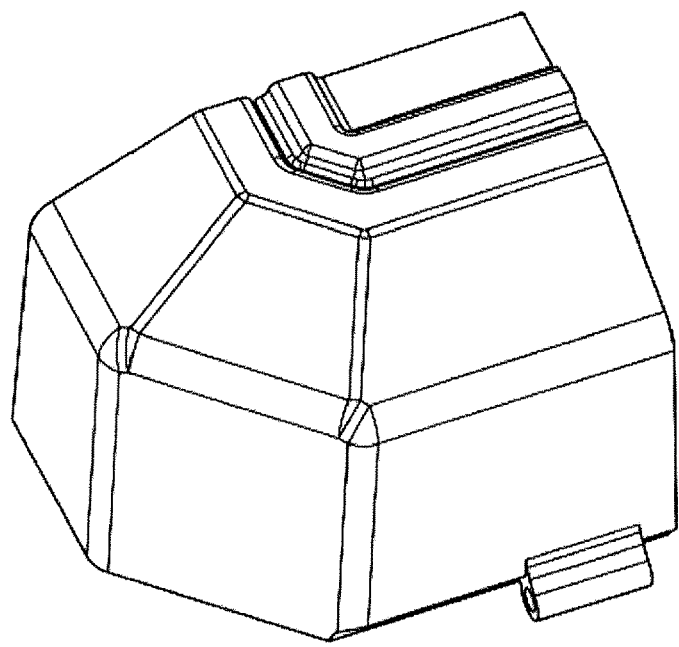
FIG. 7a is a perspective view of a corner portion of a blow molded container according to another embodiment of the present invention.
Figure 7B:
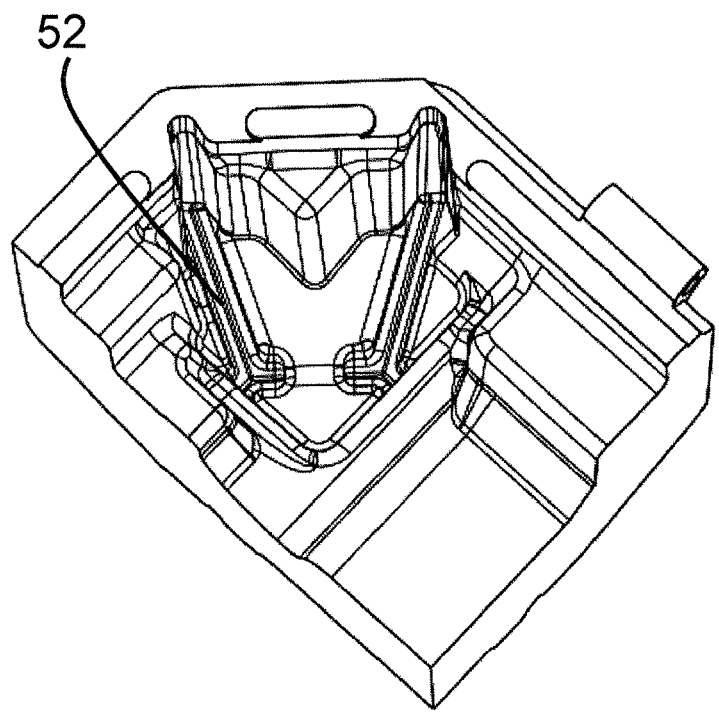
FIG. 7b shows the corner portion in FIG. 7a from another viewpoint.
Figure 7C:
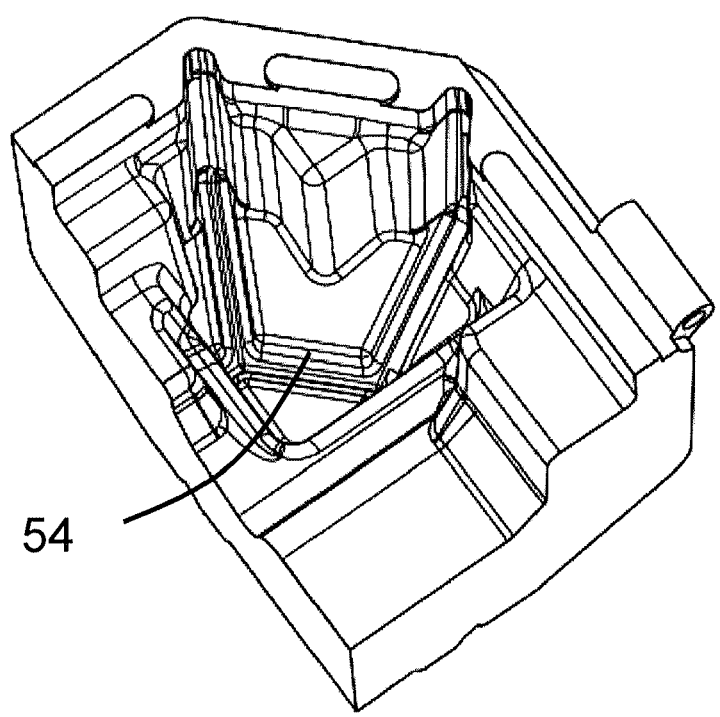

In alternative embodiments, the kissing line design in corner portions of the blow molded container has a different pattern. In FIGS. 6a-6b, it can be seen that the kissing lines 50 is in a folded shape consisted of three line segments connected head-to-tail. The corner portion design in FIG. 7a could have two alternative internal designs as illustrated in FIG. 7b and FIG. 7c respectively. The kissing lines 52 in FIG. 7b are two separated line segments while in FIG. 7c the kissing lines 54 includes two line segments connected to each other by another lateral line segment.

Figure 8A:
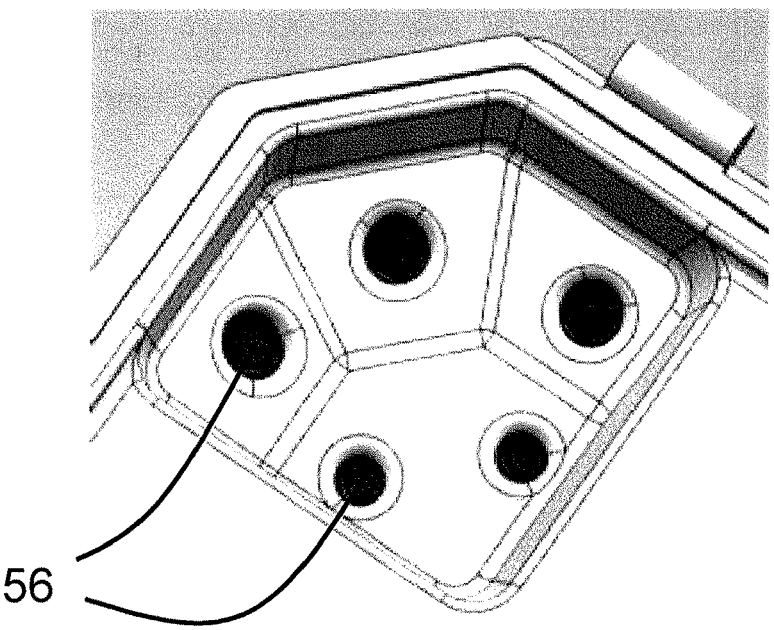
FIGS. 8a and 8b illustrate a kissing point design of corner portions of a blow molded container according to one embodiment of the present invention.
Figure 8B:
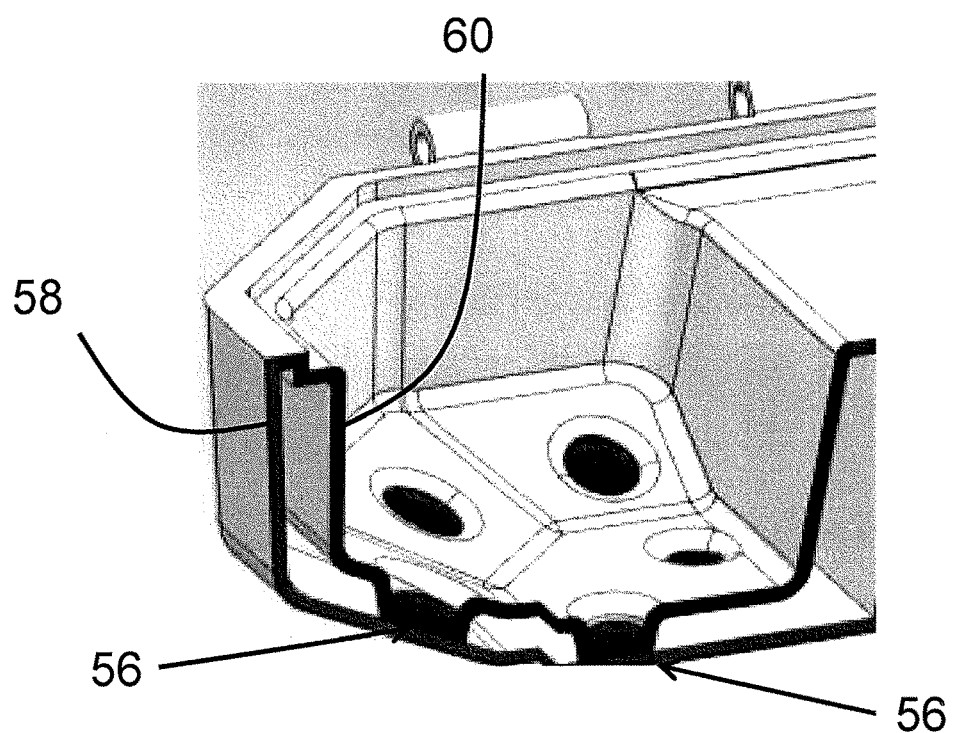

In FIGS. 8a and 8b, a kissing dot design according to an embodiment of the present invention is illustrated. Here the predetermined pattern is not a combination of line segments, but instead a plurality of dot regions 56 separated from each other forms the predetermined pattern. As shown in FIG. 8b, the first layer 58 and the second layer 60 are affixed to each other only at the dot regions 56 that are spread out in the corner portion.

Figure 9:
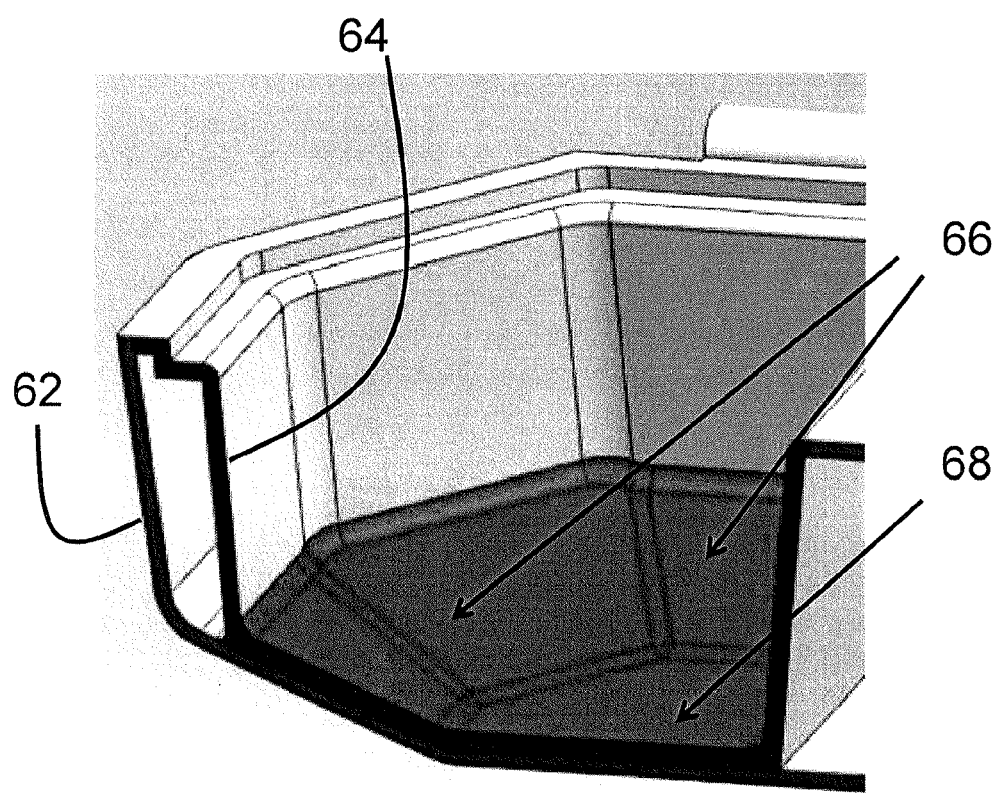
FIG. 9 illustrates a kissing area design of corner portions of a blow molded container according to one embodiment of the present invention.

In FIG. 9, a kissing area design according to another embodiment of the present invention is illustrated. Here the predetermined pattern is not lines or dots, but rather it is a continuous area. The continuous area further contains a plurality of sub-areas 66, 68, and as can be seen from FIG. 9 at least the sub-area 68 and sub-area 66 are positioned in different planes, i.e. they are not parallel to each other.

Figure 10A:
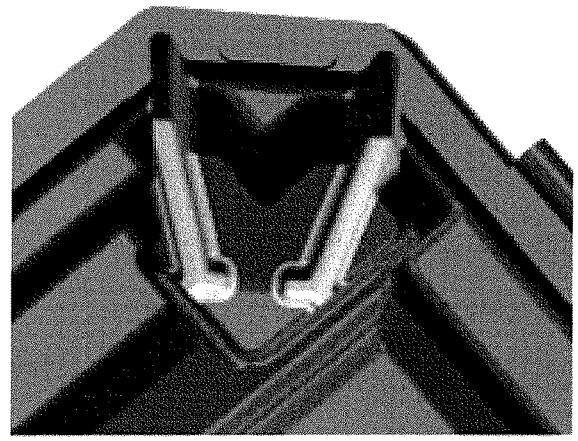
FIG. 10a illustrates an alternative kissing line design of corner portions of a blow molded container according to one embodiment of the present invention.
Figure 10B:
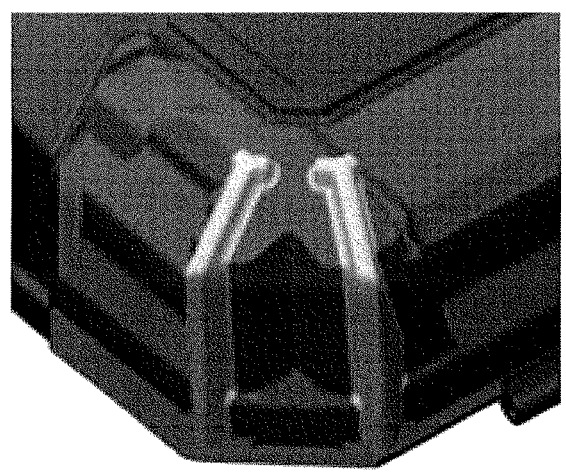
FIG. 10b shows the corner portion of FIG. 10a viewed from external surface of the blow molded container, with a perspective view of the kissing line pattern.
Figure 10C:
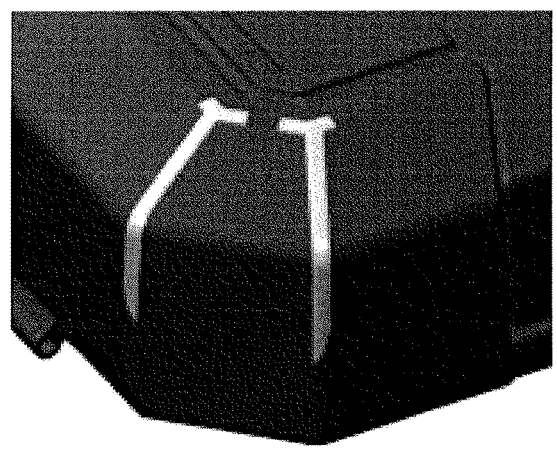
Figure 11A:
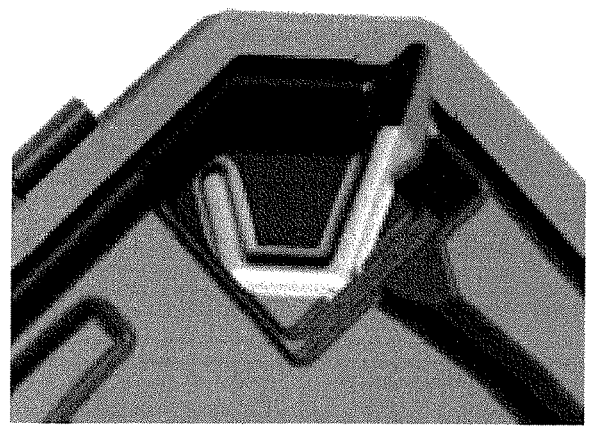
FIG. 11a illustrates an alternative kissing line design of corner portions of a blow molded container according to one embodiment of the present invention.
Figure 11B:
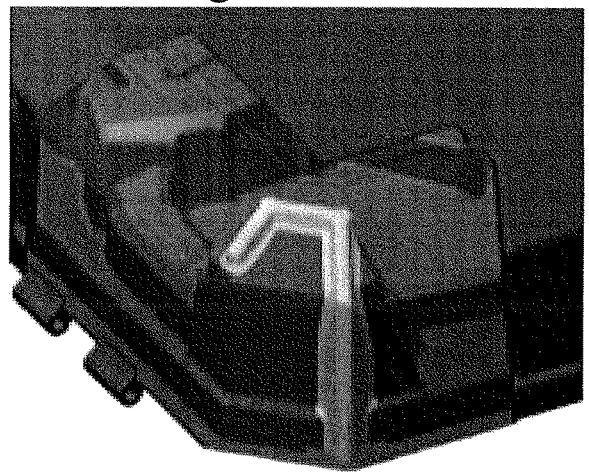
FIG. 11b shows the corner portion of FIG. 11a viewed from external surface of the blow molded container, with a perspective view of the kissing line pattern.
Figure 11C:
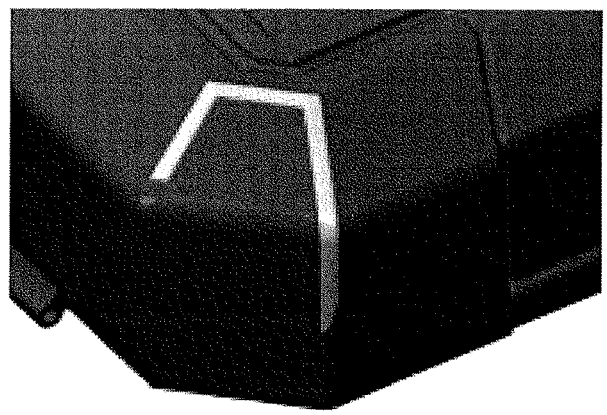
Figure 12A:
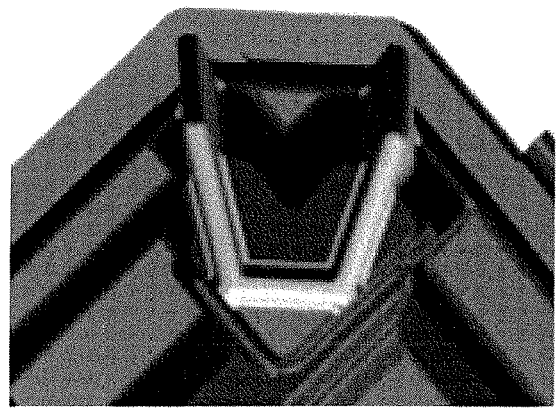
FIG. 12a illustrates an alternative kissing line design of corner portions of a blow molded container according to one embodiment of the present invention.
Figure 12B:
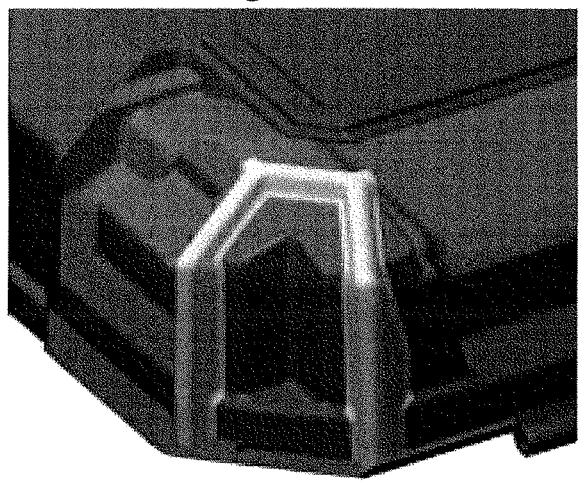
FIG. 12b shows the corner portion of FIG. 12a viewed from external surface of the blow molded container, with a perspective view of the kissing line pattern.
Figure 12C:
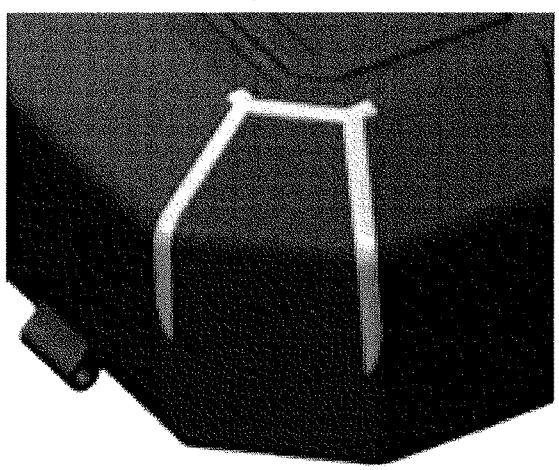
Figure 13A:
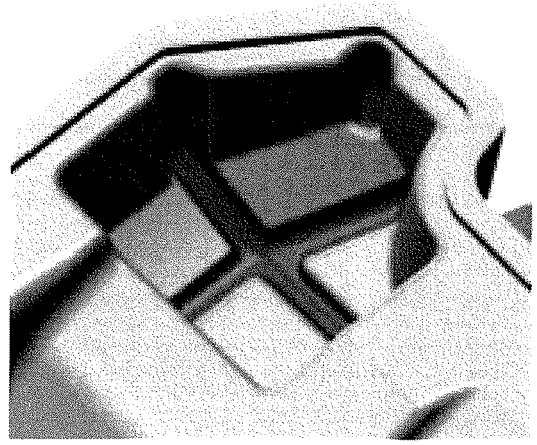
FIG. 13a illustrates an alternative kissing line design of corner portions of a blow molded container according to one embodiment of the present invention.
Figure 13B:
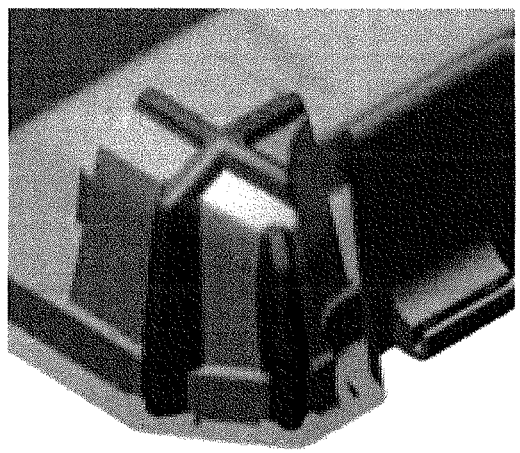
FIG. 13b shows the corner portion of FIG. 13a viewed from external surface of the blow molded container, with a perspective view of the kissing line pattern.
Figure 13C:
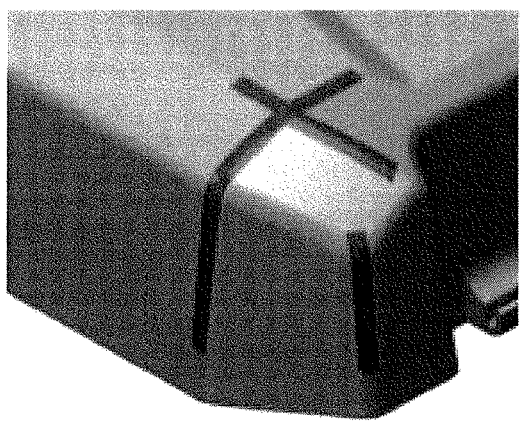
Figure 14A:
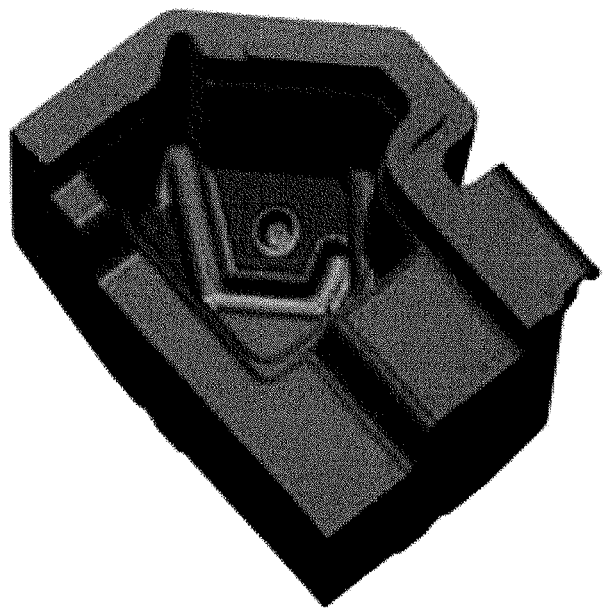
FIG. 14a illustrates an alternative kissing line design of corner portions of a blow molded container according to one embodiment of the present invention.
Figure 14B:
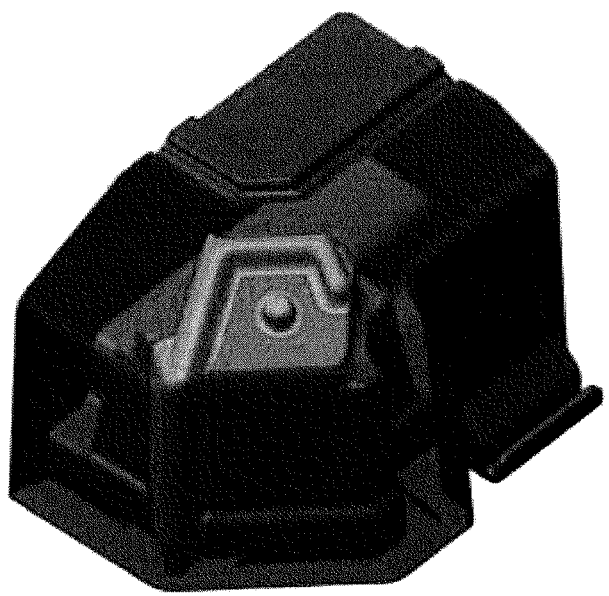
FIG. 14b shows the corner portion of FIG. 14a viewed from external surface of the blow molded container, with a perspective view of the kissing line pattern.
Figure 15A:
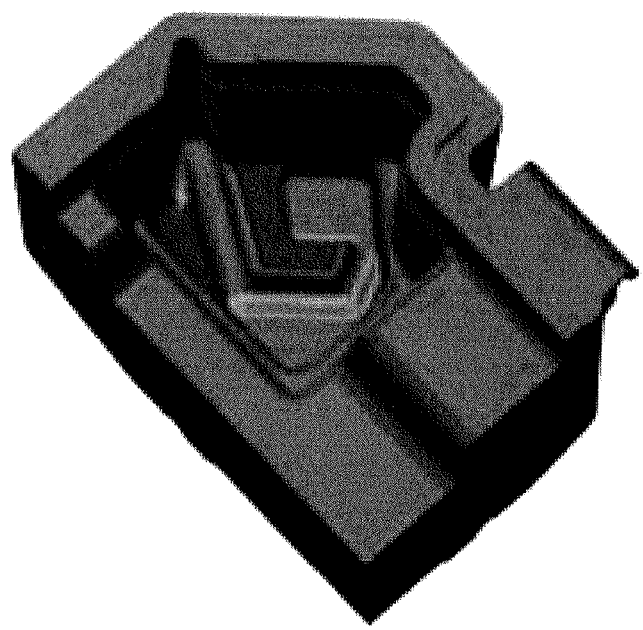
FIG. 15a illustrates an alternative kissing line design of corner portions of a blow molded container according to one embodiment of the present invention.
Figure 15B:
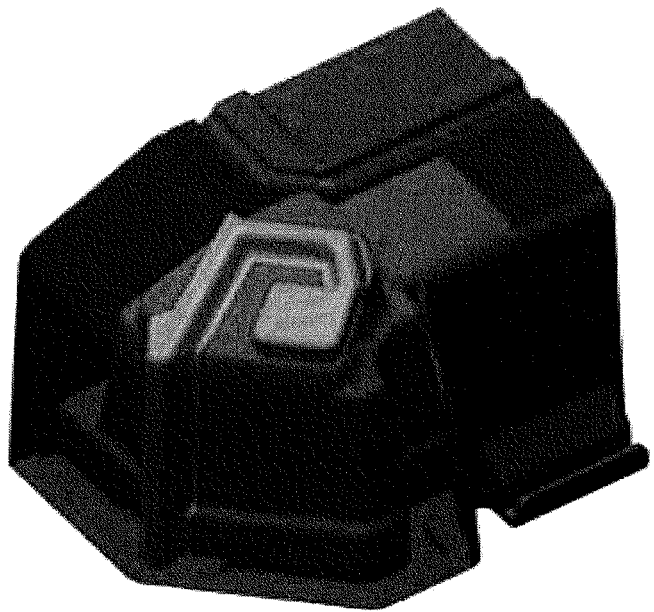
FIG. 15b shows the corner portion of FIG. 15a viewed from external surface of the blow molded container, with a perspective view of the kissing line pattern.

FIGS. 10a-15b show various kissing line designs of the corner portion according to embodiments of the present invention. In FIGS. 10a-10c, the kissing lines are consisted of two separated line segments diverged outwards similar to that in FIG. 7b. In FIGS. 11a-11c, the kissing lines are consisted of three line segments connected head-to-tail to form a folded shape, similar to that in FIG. 6b. In FIGS. 12a-12c, the kissing lines are consisted of three line segments connected head-to-tail to form a substantial cup shape, similar to that in FIG. 7c. In FIGS. 13a-13c, the kissing lines are consisted of two line segments intersecting at their middle portion to form a cross shape. In FIGS. 14a-14b, the predetermined pattern of the kissing design is consisted of a dot region and a line portion separated from the dot region, where the line portion has a shape similar to that in FIG. 6b. In FIGS. 15a-15b, the predetermined pattern of the kissing design is consisted of a line portion and a continuous area connected to one end of the line portion.

Figure 16A:
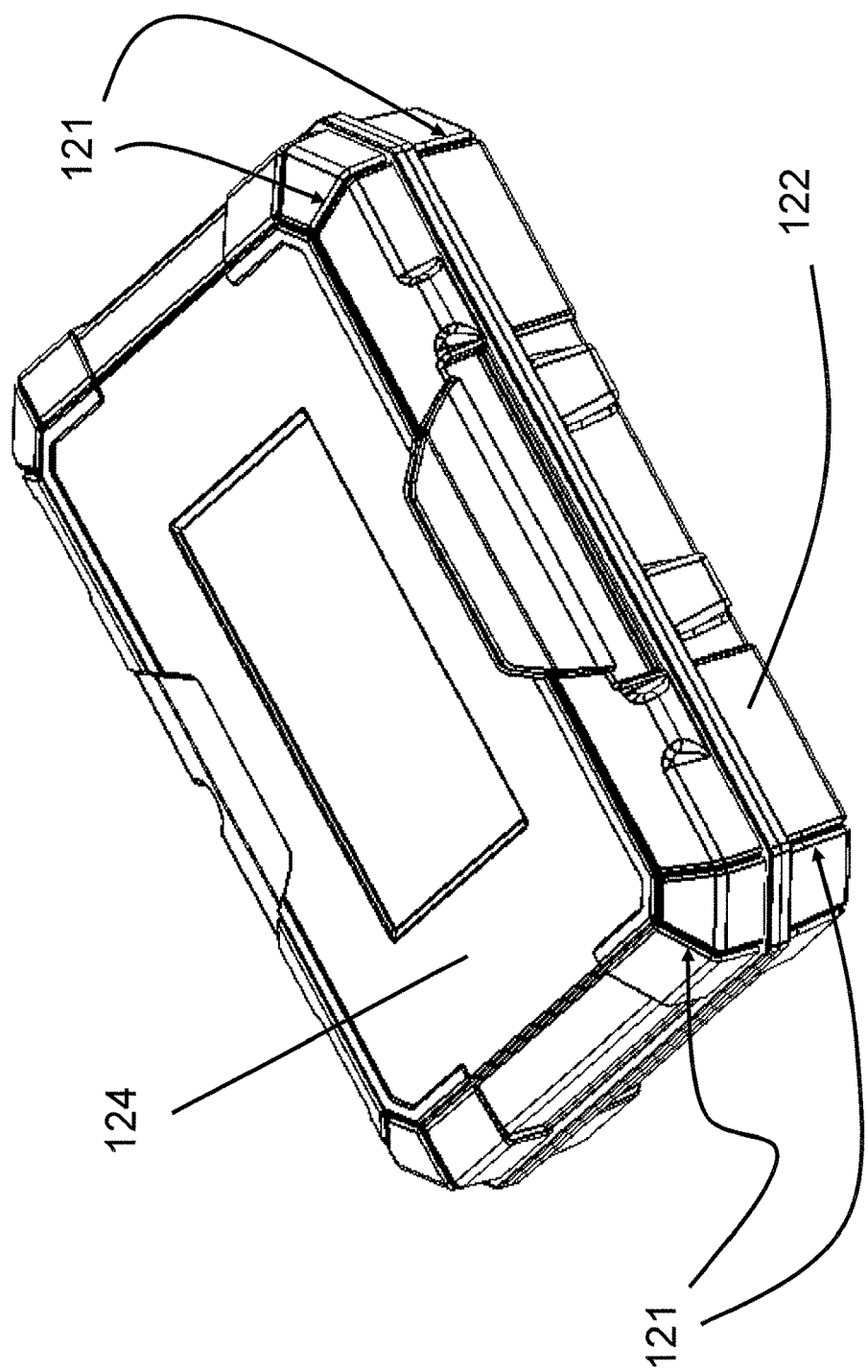
FIG. 16a is a perspective view of a blow molded container showing its top side according to another embodiment of the present invention.
Figure 16B:
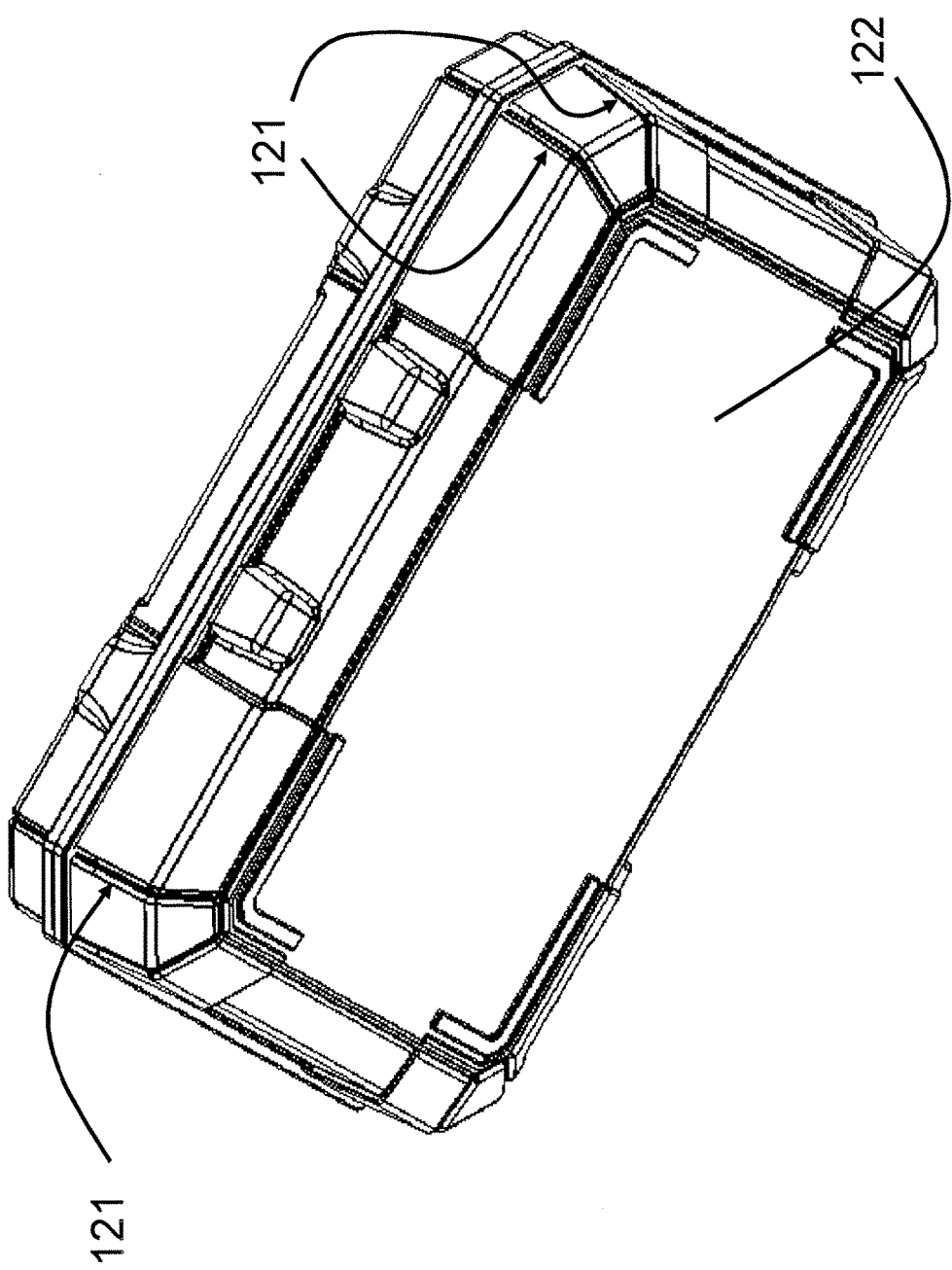
FIG. 16b is another perspective view of the blow molded container in FIG. 16a showing its bottom side.

Turning now to FIGS. 16a and 16b, in which the general appearance of a rectangular blow molded container is illustrated. Note that corner portions of this blow molded container contain visible "grooves" or patterns 121 extending from the lid member 124 to the base member 122. Such corner portions are different from those depicted in FIGS. 2a-7c and will be described in greater details below.

Figure 17A:
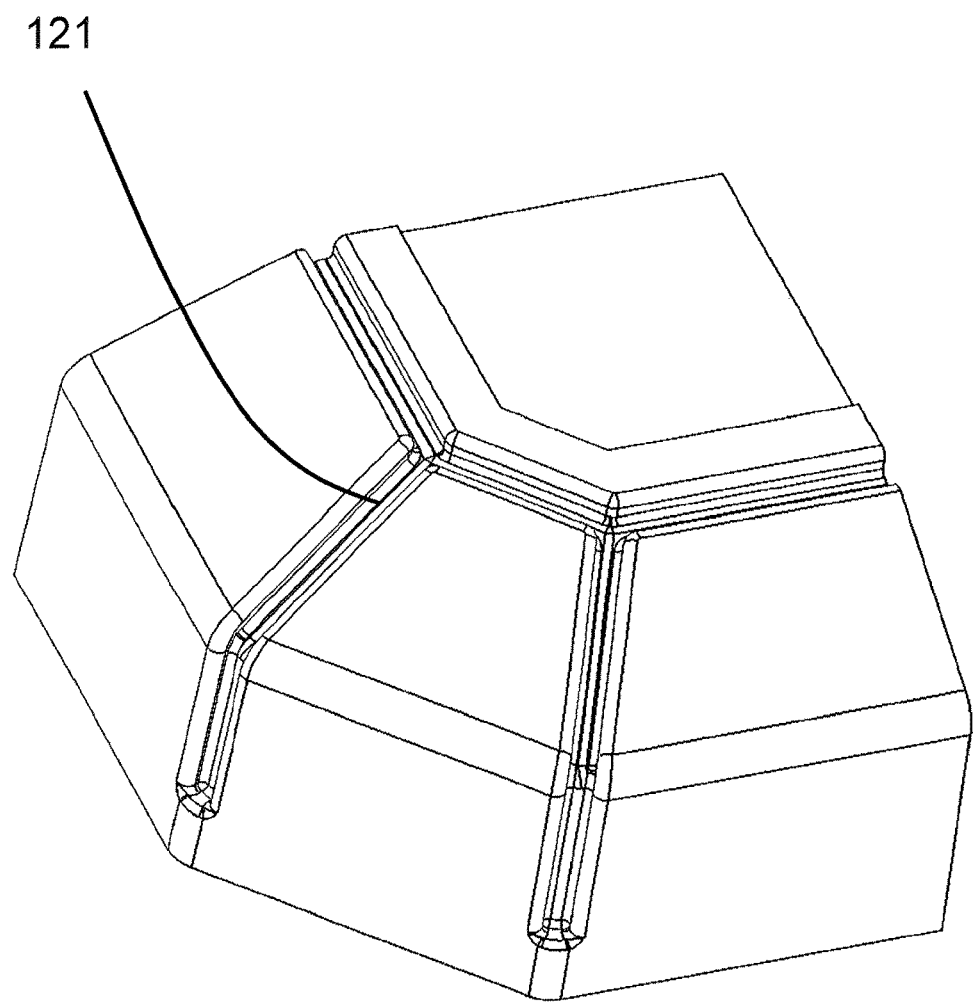
FIG. 17a is a perspective view of a corner portion of a blow molded container according to another embodiment of the present invention.
Figure 17B:
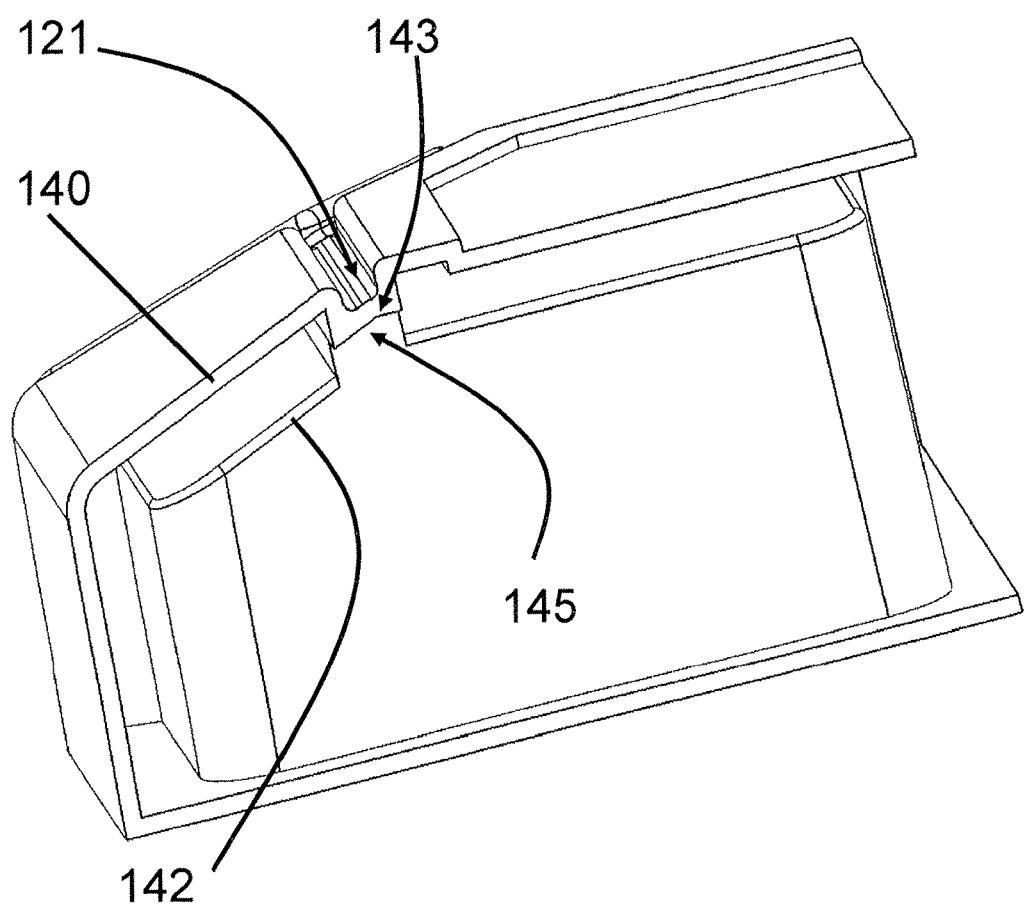
Figure 17C:
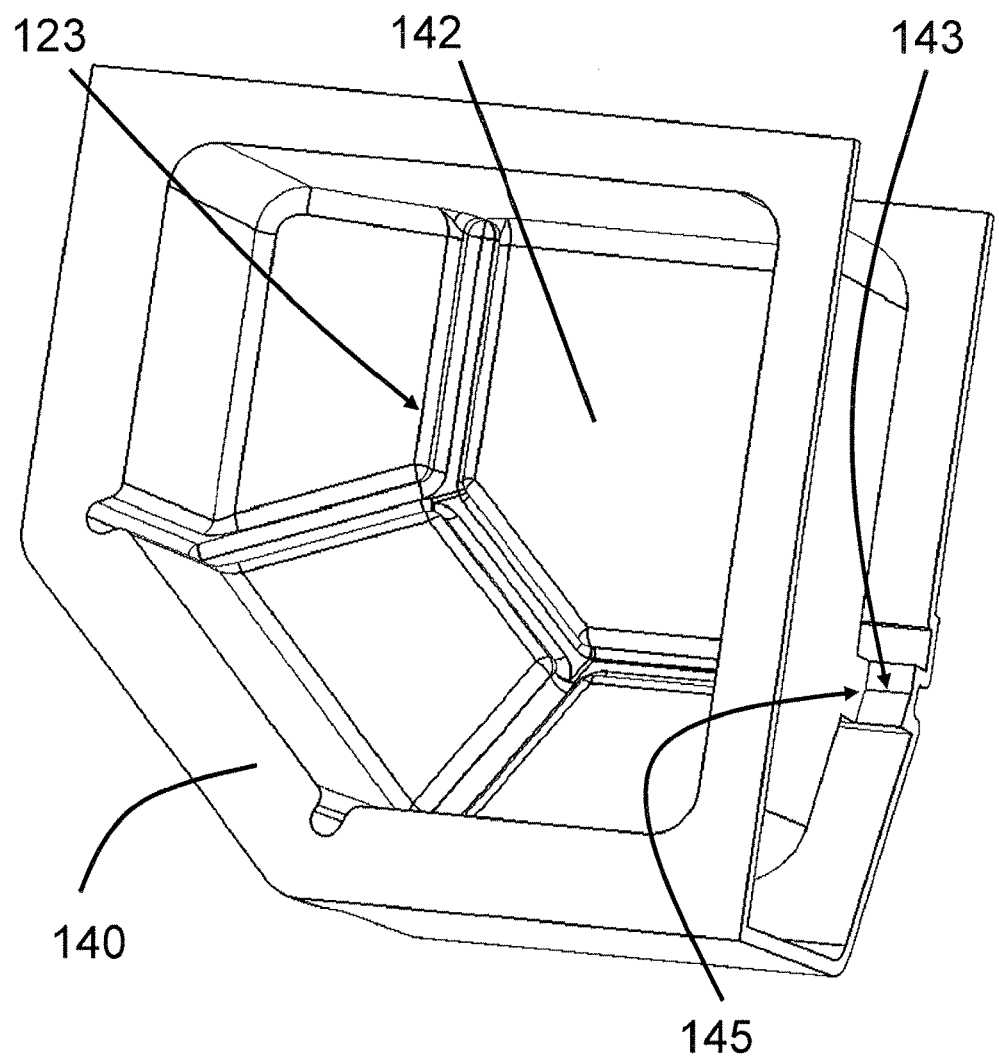
FIG. 17c is another perspective view of the corner portion in FIG. 17a from another angle.

In FIGS. 17a-17c, a corner portion similar to that found in the blow molded container in FIGS. 16a-16b is illustrated, which has on the external surface of the corner portion grooves 121 along a predetermined pattern. The shape of the predetermined pattern in FIG. 17a is similar to that in FIG. 7a, although in the latter there is no visible groove formed on the external surface of the corner portion. Since the predetermined pattern shown in FIG. 17a is a connection of multiple line segments, this is also called a kissing line design similar to the definition provided in previous embodiments.

FIG. 17b best illustrates how the visible grooves 121 are formed. The corner portion includes a first layer 140 and a second layer 142 which form the external wall and the internal wall of the blow molded container respectively. Although in FIGS. 17a-17b only a part of the blow molded container is shown (i.e. the corner portion), the first layer 140 and the second layer 142 extends to other parts of the blow molded container as well in this embodiment to form the whole main member. The first layer 140 and a second layer 142 are adhered together along a predetermined pattern, along which the visible grooves 121 are formed and visible to the user from outside of the blow molded container.

As shown in FIG. 17b, in certain regions of the corner portion the first layer 140 forming the external surface of the blow molded container and the second layer 142 forming the internal surface of the blow molded container are affixed together, but are otherwise separated from each other elsewhere. At the location where the first layer 140 and the second layer 142 are affixed together along the predetermined pattern, the first layer 140 is formed with a first protruding part 143 and the second layer 142 is formed with a second protruding part 145. The surface of the first protruding part 143 and the surface of the second protruding part 145 are affixed together so that the first layer 140 and the second layer 142 are affixed together along the predetermined pattern. As one can see the first protruding part 143 is formed by a portion of the first layer 140 bent to form an protruding, yet essentially cuboid structure and the bent portion of the first layer 140 creates a recess with rectangular cross-section that is walled on its three sides by the external surface of the first layer 140. Although not shown, the second protruding part 145 is also formed in a similar way. The recess is the visible groove 121 that can be observed by a user from the outside of the blow molded container. One can readily see from FIG. 17b that the surfaces of the first protruding part 143 facing the second layer 142 is closer to the second layer 142 than other portions of the first layer 140 immediately adjacent to the predetermined pattern. Similarly, surfaces of the second protruding part 145 facing the first layer 140 is closer to the first layer 140 than other portions of the second layer 142 immediately adjacent to the predetermined pattern. In other words, the first protruding part 143 and the second protruding part 145 are formed to protrude toward the other one of the first layer 140 and second layer 142 respectively. Such a configuration ensures that the first layer 140 and second layer 142 are only affixed together along the predetermined pattern while kept away from each other otherwise. In a preferred embodiment, the first protruding part 143 and the second protruding part 145 are of equal height, in other words the portions of the first layer 140 and second layer 142 (that are the first protruding part 143 and the second protruding part 145) touches each other at middle way in the distance between the first layer 140 and second layer 142.

In FIG. 17c, it is shown that as a result of the second protruding part formed on the second layer 142, viewing from internal space of the corner portion one can also see various grooves 123 on the inner surface of the second layer 142. Formation of the grooves 123 is in principle similar to that of grooves 121 described above. In the present embodiment, both on the external surface and inner surfaces of the casing there will be formed visible grooves due to bent portions of both the first and second layers.

Preferably, the distance between the first layer 140 and the second layer 142 is kept constant when they are separated. Also, preferably the thickness of the first layer 140 and the second layer 142 are equal, and in one exemplary embodiment the thickness of both the first layer 140 and the second layer 142 is 2.5 mm.

Figure 18A:
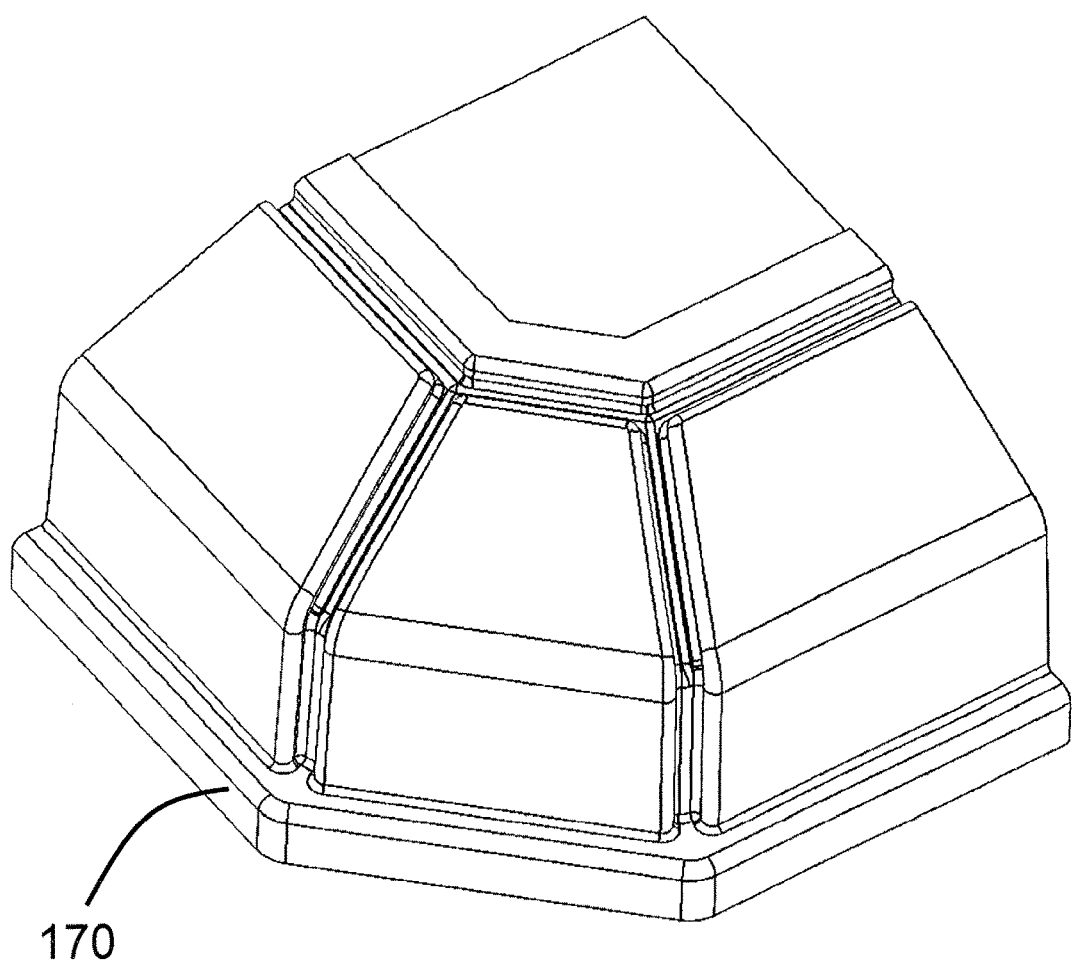
FIG. 18a is a perspective view of a corner portion of a blow molded container according to another embodiment of the present invention.
Figure 18B:
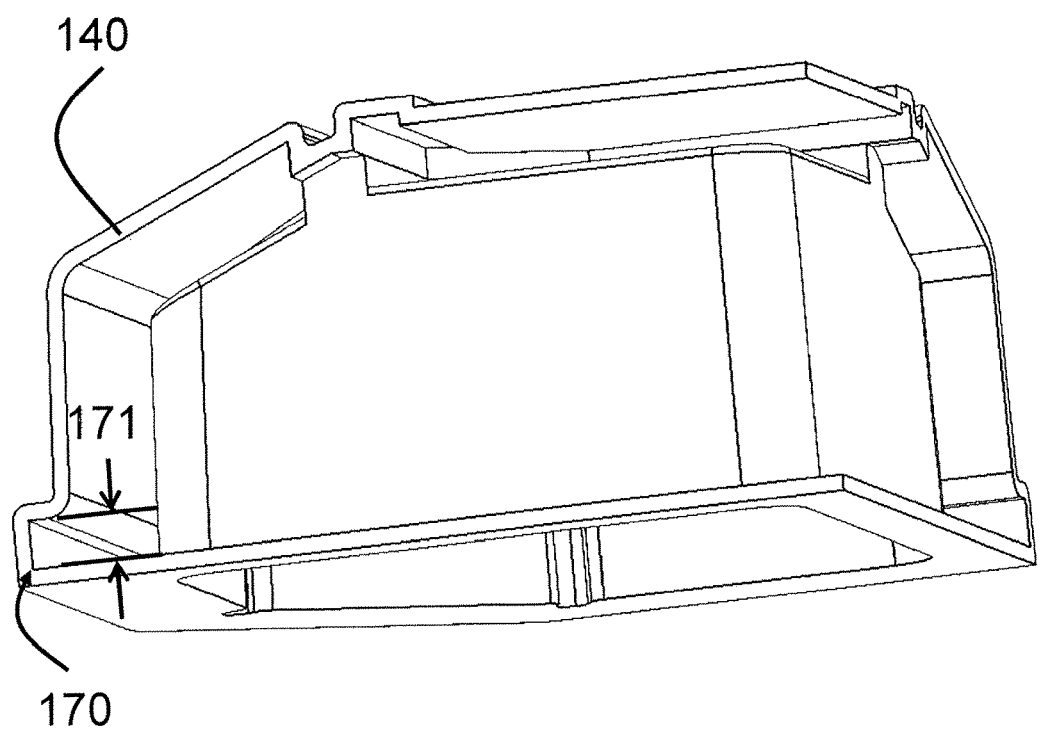
Figure 18C:
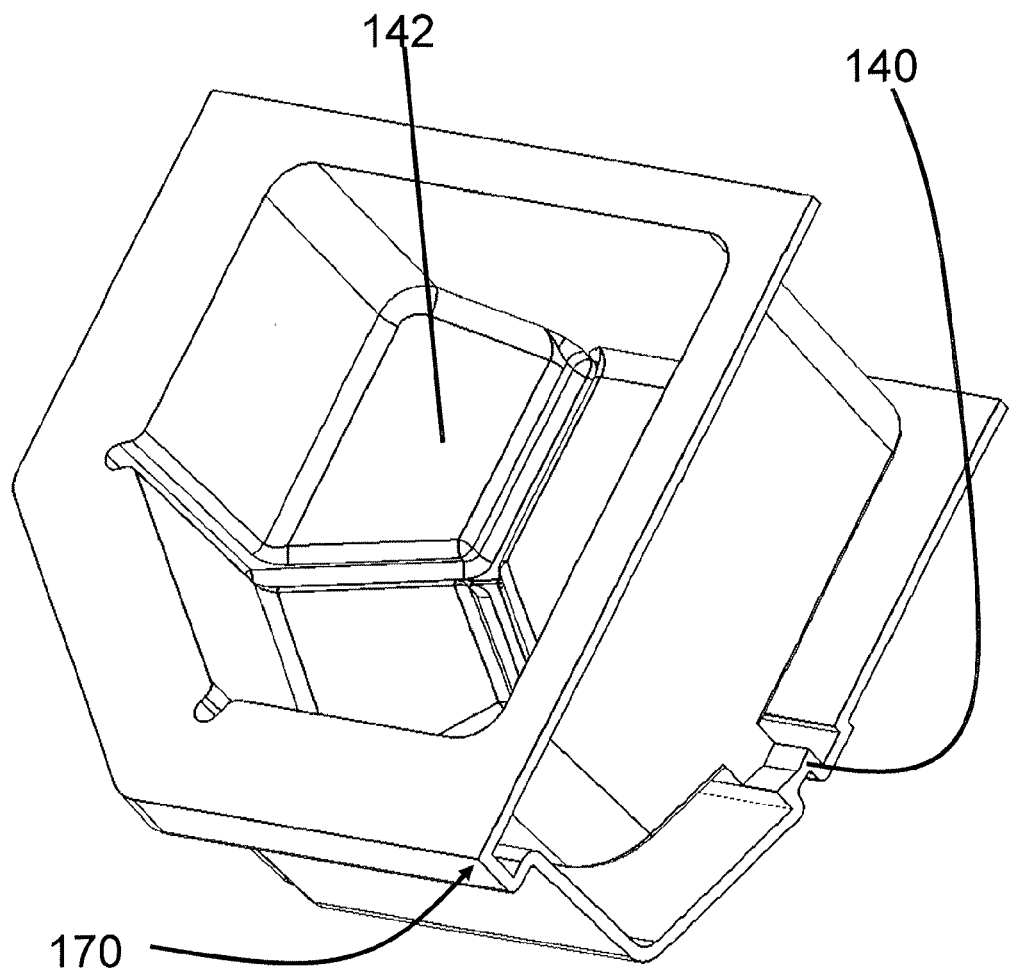
FIG. 18c is another perspective view of the corner portion in FIG. 18a from another angle.

FIGS. 18a to 18c show a corner portion in general similar to that in FIGS. 17a to 17c, except that the corner portion in FIGS. 18a to 18c includes a rim portion. The rim portion is formed by bending a portion of the first layer 140, as best shown in FIG. 18b. While in this embodiment the first layer 140 and second layer 142 are affixed together at certain locations (that is along a predetermined pattern) while spaced apart otherwise similar to that in FIGS. 17a-17c, a second portion of the first layer 140, which is different from the portions of the first layer 140 affixed to the second layer 142, is also bent to form a third protruding part 170. The third protruding part 170 protrudes from the first layer 140 toward a direction away from the tool cavity (not shown). As shown in FIGS. 18b and 18c, the protruding part 170 is a single layer structure, and has a span 171 between the two side walls so that a rim portion with a certain width is formed.

Figure 19:
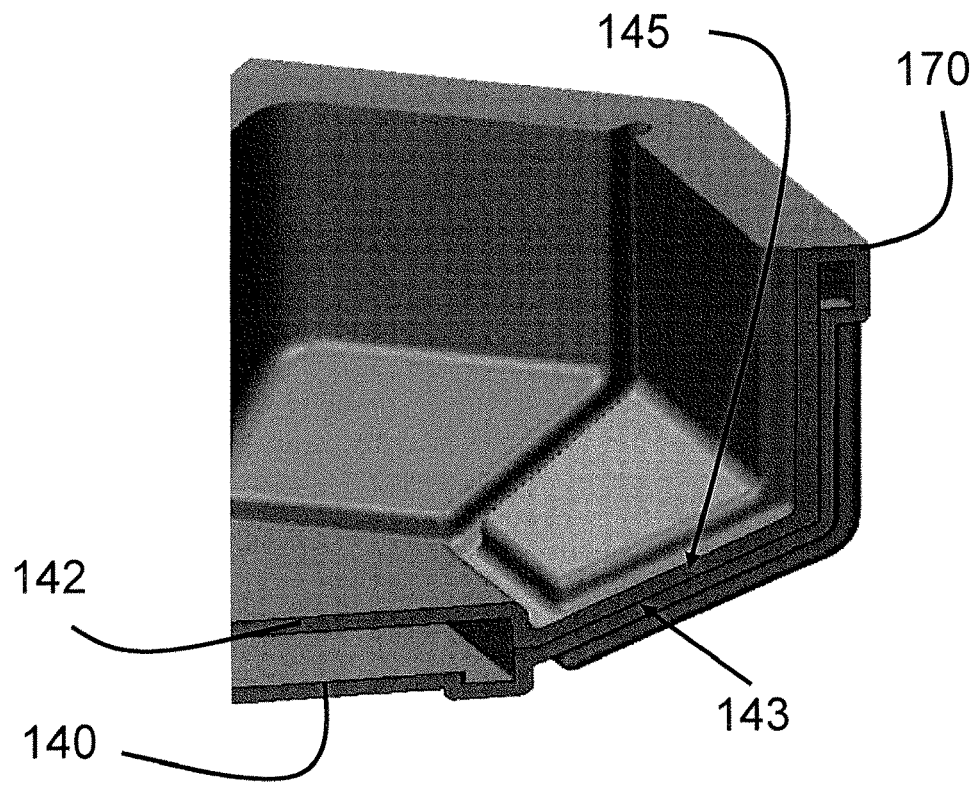
FIG. 19 is a cross-sectional view of a corner portion of a blow molded container according to another embodiment of the present invention.
Figure 20:
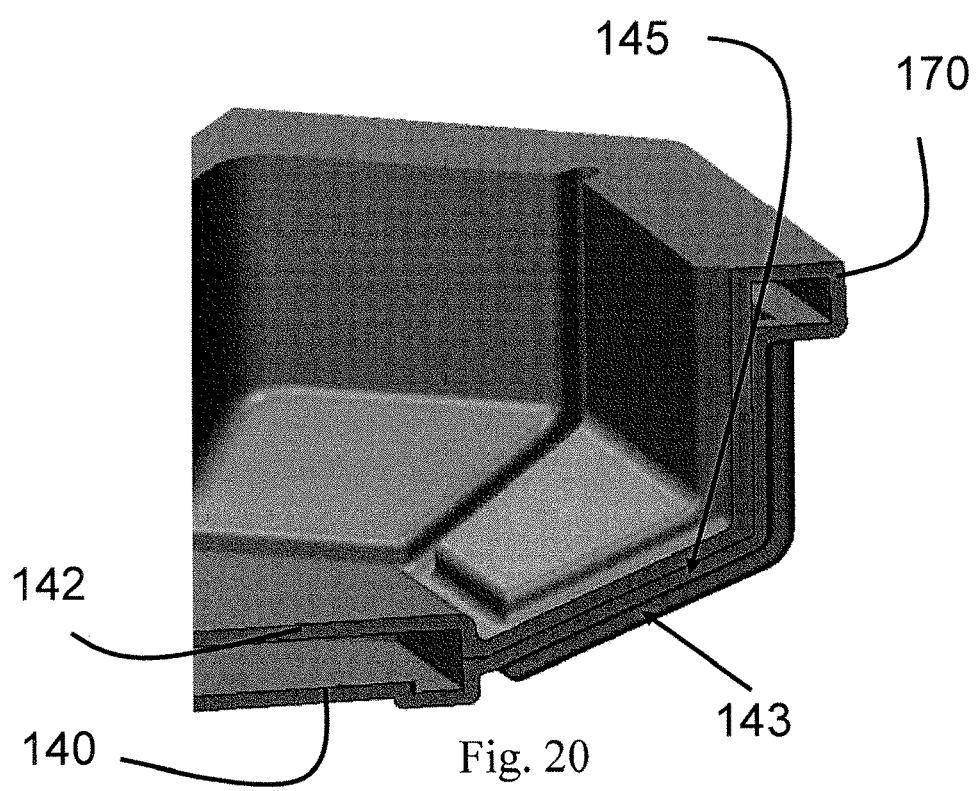
FIG. 20 is a cross-sectional view of a corner portion of a blow molded container according to another embodiment of the present invention.

In alternative embodiments shown in FIGS. 19 and 20, other corner portions with particular rim portion designs in the present invention are shown. In FIG. 19, a first layer 140 and a second layer 142 are affixed together along a predetermined pattern similar to that described above. However, at the edge of the corner portion there is a rim portion formed by a third protruding portion 170, and the third protruding part 170 is in the form of a bent surface connecting the first layer 140 and second layer 142.

It should be noted that although in FIG. 16a-FIG. 20 the predetermined pattern along which the two layers are affixed together are connection of line segments, i.e. kissing line designs, other types of pattern may be equally applied, including a plurality of dot regions separated from each other (kissing dots), and a continuous area (kissing area).

The above exemplary embodiments thus show the use of kissing design of internal and external layers of the blow molded container along a predetermined pattern. "Kissing" as described herein means making outside and inside walls/layers touching together, and a skilled person should realize that any suitable means or techniques may be used to affixing outside and inside walls/layers together, including but not limited to glues or other bonding agents. By affixing two walls together at the kissing lines the strength of the corner portion can be greatly improved since any impact on the external surface at the kissing lines will be transferred mostly to the inner surface as well, therefore avoid deformation or collapse of one wall relative to another.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

What is claimed is:

1. A blow molded container comprising:
    a main member comprising a top, a first side orthogonal to the top, a second side orthogonal to the top, an external wall, and an internal wall forming a tool cavity;
    a corner portion defined as a portion of the main member, the corner portion comprising a bevel wall positioned between the top, the first side, and the second side,
    wherein at said corner portion, said main member comprises at least a first layer and a second layer; said first layer forming at least a part of the external wall and said second layer forming at least a part of the internal wall,
    wherein said first layer and said second layer are affixed together at the intersection of the bevel wall and each of the top, the first side, and the second side to form a predetermined pattern.

2. The blow molded container according to claim 1, wherein said predetermined pattern is a plurality of dot regions separated from each other.

3. The blow molded container according to claim 1, wherein said predetermined pattern is a continuous area.

4. The blow molded container according to claim 3, wherein said continuous area further comprises a plurality of sub-areas, wherein at least two said sub-areas are positioned in different planes.

5. The blow molded container according to claim 1, wherein said predetermined pattern further comprises a plurality of line segments connected to each other.

6. The blow molded container according to claim 1, wherein said main member is in a rectangular shape.

7. The blow molded container according to claim 1, wherein said first layer and said second layer are of equal thickness.

8. The blow molded container according to claim 1, wherein said first layer is formed with a first protruding part along said predetermined pattern, and said second layer is formed with a second protruding part along said predetermined pattern; said first protruding part and said second protruding part affixed together.

9. The blow molded container according to claim 8, wherein a surface of said first protruding part facing said second layer is closer to said second layer than a portion of said first layer immediately adjacent to said predetermined pattern.

10. The blow molded container according to claim 8, wherein a surface of said second protruding part facing said first layer is closer to said first layer than a portion of said second layer immediately adjacent to said predetermined pattern.

11. The blow molded container according to claim 8, wherein said first protruding part and said second protruding part are of equal height.

12. The blow molded container according to claim 8, wherein said first layer is formed with a third protruding part which protrudes from said first layer toward a direction away from said tool cavity.

13. The blow molded container according to claim 12, wherein said third protruding part is in the form of a rim portion on an external surface of said blow molded container.

14. The blow molded container according to claim 13, wherein said third protruding part is a portion of said first layer bent to form said rim.

15. The blow molded container according to claim 12, wherein said third protruding part is in the form of a bent surface connecting said first layer and second layer.

16. The blow molded container according to claim 1, wherein said first layer is formed with a rim portion on an external surface of said blow molded container, wherein said rim portion is disposed at a junction between said first layer and said second layer, and wherein said rim portion protrudes from said first layer toward a direction away from said tool cavity.

17. The blow molded container according to claim 1, wherein said main member includes at least four corner portions, and wherein each corner portion includes a respective one of the predetermined pattern of affixation between said first and second layers.

18. The blow molded container according to claim 1, wherein the external wall of the corner portion includes visible grooves formed along the predetermined pattern.

* * * * *